United States Patent
Choi et al.

(10) Patent No.: US 10,960,969 B2
(45) Date of Patent: Mar. 30, 2021

(54) METHOD OF IMPROVING A STABILITY SPEED OF A TILTROTOR AIRCRAFT

(71) Applicant: Bell Helicopter Textron Inc., Fort Worth, TX (US)

(72) Inventors: Jouyoung Jason Choi, Southlake, TX (US); Frank Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 294 days.

(21) Appl. No.: 16/169,761

(22) Filed: Oct. 24, 2018

(65) Prior Publication Data

US 2020/0130813 A1    Apr. 30, 2020

(51) Int. Cl.
    *B64C 11/00*    (2006.01)
    *B64C 11/06*    (2006.01)
    *B64C 29/00*    (2006.01)
    *B64C 11/32*    (2006.01)

(52) U.S. Cl.
    CPC ............ *B64C 11/008* (2013.01); *B64C 11/06* (2013.01); *B64C 29/0033* (2013.01); *B64C 11/32* (2013.01)

(58) Field of Classification Search
    CPC ....... B64C 11/008; B64C 11/06; B64C 11/32; B64C 29/0033
    USPC ...................................................... 244/12.4
    See application file for complete search history.

(56) References Cited

U.S. PATENT DOCUMENTS

| | | | |
|---|---|---|---|
| 6,607,161 B1 * | 8/2003 | Krysinski | B64C 9/00 244/7 A |
| 6,616,095 B2 | 9/2003 | Stamps et al. | |
| 7,828,525 B2 | 11/2010 | Stamps et al. | |
| 8,047,466 B2 | 11/2011 | Stamps et al. | |
| 8,287,237 B2 | 10/2012 | Stamps et al. | |
| 8,662,442 B2 | 3/2014 | Stamps et al. | |
| 8,936,436 B2 | 1/2015 | Stamps et al. | |
| 9,039,373 B2 | 5/2015 | Stamps | |
| 9,169,735 B2 | 10/2015 | Stamps | |
| 9,327,831 B2 | 5/2016 | Schank et al. | |
| 2008/0292468 A1 * | 11/2008 | Stamps | B64C 27/82 416/244 R |
| 2011/0194934 A1 * | 8/2011 | Popelka | B64C 27/001 416/1 |
| 2013/0105637 A1 * | 5/2013 | Stamps | B64C 27/605 244/76 R |
| 2013/0156575 A1 * | 6/2013 | Stamps | B64C 27/605 416/1 |
| 2014/0133980 A1 * | 5/2014 | Stamps | B64C 27/605 416/1 |

(Continued)

FOREIGN PATENT DOCUMENTS

| | | |
|---|---|---|
| EP | 1232943 A2 | 8/2002 |
| EP | 2589534 B1 | 7/2014 |
| EP | 3360780 A1 | 8/2018 |

*Primary Examiner* — Claude J Brown
(74) *Attorney, Agent, or Firm* — Shackelford, Bowen, McKinley & Norton, LLP

(57) ABSTRACT

A method of increasing a stability speed of a tiltrotor aircraft includes pivoting a rotor assembly having at least three rotor blades from a first position for operating the tiltrotor aircraft in a helicopter mode to a second position for operating the tiltrotor aircraft in an airplane mode, and increasing a stiffness of the rotor assembly when the rotor assembly is in the second position.

19 Claims, 3 Drawing Sheets

(56) References Cited

U.S. PATENT DOCUMENTS

2015/0274290 A1* 10/2015 Fenny ................... B64C 27/41
                                                              244/17.25
2016/0152329 A1    6/2016 Tzeng et al.
2017/0144746 A1* 5/2017 Schank ............... B64C 29/0033
2017/0259905 A1* 9/2017 Kooiman ............. B29D 24/005
2018/0346111 A1* 12/2018 Karem ................ B64C 29/0033

* cited by examiner

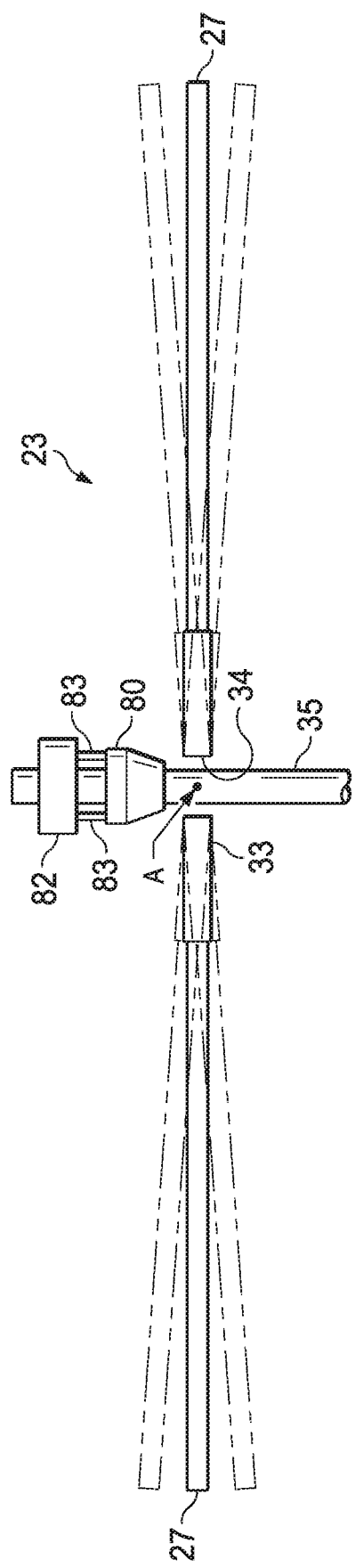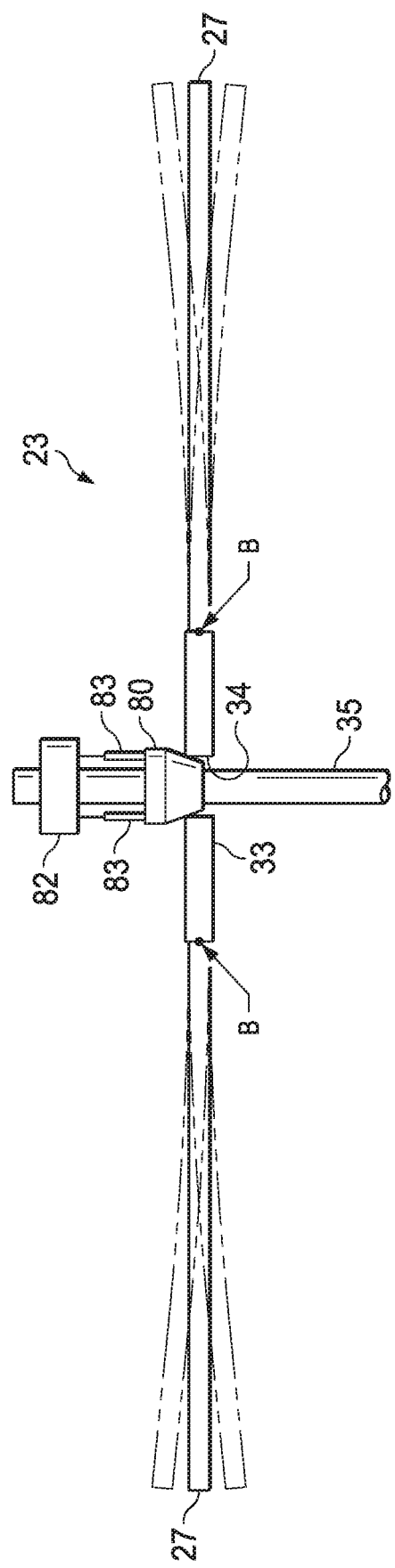

METHOD OF IMPROVING A STABILITY SPEED OF A TILTROTOR AIRCRAFT

BACKGROUND

This section provides background information to facilitate a better understanding of the various aspects of the disclosure. It should be understood that the statements in this section of this document are to be read in this light, and not as admissions of prior art.

Tiltrotor aircraft have rotors that are moveable between a generally vertical orientation for rotor-borne flight (helicopter mode) and a generally horizontal orientation for wing-borne flight (airplane mode). One example of a tiltrotor aircraft is the Bell/Boeing V-22, which has a pair of three-bladed rotors. To allow for use of a larger fuselage, more thrust, and/or higher speed, tiltrotors having four-bladed rotors have been proposed. However, four-bladed versions using prior-art types of gimbaled rotor hubs can be unstable in airplane mode due to inadequate damping of whirling.

Rotor-blade control systems for helicopters and tiltrotor aircraft are complex electrical and/or mechanical systems that respond to a pilot's input. Rotor-blade control systems must accommodate forces that act upon rotor assemblies. Mechanical control systems typically include a swashplate that includes a lower stationary portion and an upper rotating portion. Typically, the lower stationary portion is fixed in position and does not rotate, but has the ability to move up and down and/or tilt in any given direction. This is commonly referred to as the "stationary" or "non-rotating" plate. Pilot inputs alter the vertical position of the stationary plate through the collective control and the tilt of the stationary plate through the cyclic control. The rotating portion of the swashplate arrangement is free to rotate relative to the stationary plate. Pilot inputs to the non-rotating portion are passed through to the rotating portion of the control systems. The rotating portion of the control system is mechanically connected to each individual rotor blade. For example, in one type of control system, pitch links connect pitch horns of the rotor blades to the rotating plate of the swashplate. This allows the swashplate to alter the blade angle of each rotor blade. However, it is necessary to include in control systems a subsystem which reduces the degree of flapping as much as possible. Flapping refers to an up-and-down movement of a rotor blade positioned at a right angle to the plane of rotation or can refer to a gimbaling of the hub or a teetering rotor. In tiltrotor aircraft, it is especially important to counteract the detrimental effects of flapping, especially because the aircraft is capable of high speed travel, particularly in the airplane mode of flight.

In the prior art, there are two basic approaches: one is to utilize an angled flap hinge; the other is to utilize offset pitch horns. Both of these approaches have the effect of introducing a kinematic pitch-flap coupling, or delta-3, parameter into the system. The delta-3 parameter relates to the amount of blade pitch change occurring for a given amount of blade flapping motion. Designers of tiltrotor aircraft seek to optimize delta-3 for countering flapping that is encountered in flight.

Tiltrotor aircraft can achieve very high airspeeds and altitudes when operating in the airplane mode configuration. Existing tiltrotor aircraft have demonstrated airspeeds up to 385 knots and altitudes up to 20,000 feet, with emerging tiltrotor aircraft designs achieving even higher airspeeds. These capabilities offer significant benefits over conventional helicopters, but at the same time, introduce the possibility of new types of aeroelastic instability which are not present in conventional helicopters. One of the most demanding stability issues is referred to as prop rotor aeroelastic instability.

Prop rotor aeroelastic instability is a phenomenon that can occur in the airplane mode of flight. This instability is a result of adverse aeroelastic coupling of the rotor system and the wing and pylon system to which it is attached. This instability is a significant design driver, which implies that the requirements for wing structural stiffness and pylon mass properties are typically based on prop rotor aeroelastic stability requirements. If the rotor and wing design parameters are not selected properly, then the prop rotor aeroelastic instability may limit the useable speed range of a high-speed tiltrotor. For this reason, design solutions and control systems are sought which maximize the aeroelastic stability with the minimum weight impact.

The prop rotor aeroelastic instability is a phenomenon similar to classical propeller whirl flutter, but it is more complex because a tiltrotor aircraft has a flapping degree of freedom which is not present on a classical propeller. The rotor flapping degree of freedom causes additional destabilizing forces that can lead to instabilities that are not possible on a conventional propeller. The physical mechanism for this instability is the destabilizing rotor shear forces that are transmitted to the wing/pylon system in a high-speed airplane flight condition. These destabilizing rotor shear forces are generated as a result of the rotor flapping response to a disturbance such as a gust or a pilot maneuver.

SUMMARY

An example of a method of increasing a stability speed of a tiltrotor aircraft includes pivoting a rotor assembly having at least three rotor blades from a first position for operating the tiltrotor aircraft in a helicopter mode to a second position for operating the tiltrotor aircraft in an airplane mode, and increasing a stiffness of the rotor assembly when the rotor assembly is in the second position.

Another example of a method of increasing a stability speed of a tiltrotor aircraft includes pivoting a rotor assembly having at least three blades from a first position for operating the tiltrotor aircraft in a helicopter mode to a second position for operating the tiltrotor aircraft in an airplane mode, and moving, during flight, flap centers of each of the at least three rotor blades radially outward from a mast of the rotor assembly to lower a delta-3 of the rotor assembly when the rotor assembly is in the second position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 4 and 5 are schematic illustrations of a rotor assembly in an unlocked and locked configuration, respectively, according to aspects of the disclosure.

DETAILED DESCRIPTION

Figure 1:
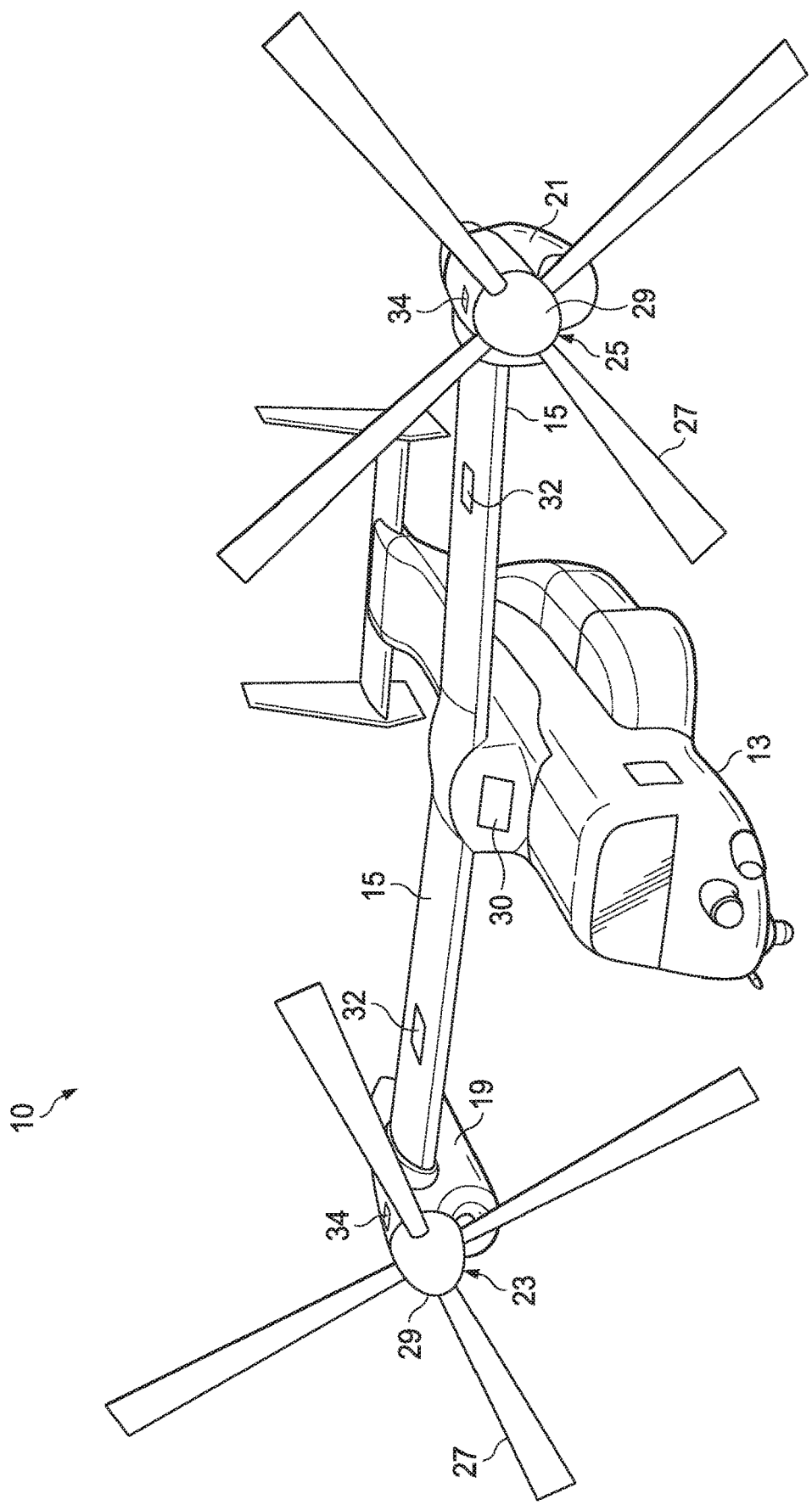
FIG. 1 is a perspective view of an illustrative tiltrotor aircraft in the airplane mode according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The delta 3 kinematic coupling term is the most important design aspect relating to prop rotor whirl stability for gimbaled tilt rotors and any other tilt rotor hub type that flaps in response to changes in blade angle of attack relative to the mast center line. The only rotor system that does not use delta 3 is a rigid rotor system. Rigid rotors are stiff out of plane and structurally do not allow flapping relative to the mast. This aspect of rigid rotors results in high hub moments and shear loads that are the result of preventing the rigid rotor from flapping responsive to changes in the aerodynamic lifting forces in the blades. Rigid rotors resist whirl motions by being too stiff to allow this motion.

Compared to rigid rotors, the instant design has a switchable delta 3 by changing the blade station of the flapping hinge using a movable gimbal lockout feature. In helicopter mode the gimbal is free to tilt which allows the flapping hinge to be at blade station zero, which is at the hub to mast joint. High flapping in helicopter mode is desirable since it results in Hub shears that are used to control the flight path of the aircraft. If there are more than one available flapping hinges, all the flapping will occur at the innermost hinge due to the reaction moment being minimized at that blade station. For a four bladed gimbaled tilt rotor hub this results in a delta 3 term of about −45° when the flapping is at the gimbal point at station zero. In helicopter mode of a tilt rotor, a delta 3 value of −45° is acceptable for safe flight. In low speed airplane mode of a tilt rotor, a delta 3 value of −45° is also acceptable for safe flight. There is an airspeed limit for airplane mode of a tilt rotor a delta 3 value of −45° to avoid whirl mode instability. If the gimbal hub flapping stop is deployed to lock out flapping at the station zero gimbal point the effective flapping hinge will move out in blade station to the next innermost flapping hinge but the pitch horn to pitch link attachment point will not move so the delta 3 term will move to a different coupling term. If the new flapping hinge is located at a slightly less blades station for the pitch horn to pitch link attachment point, a delta 3 term of −15° can be achieved. This −15° delta 3 term value will allow the tilt rotor aircraft to go to a much higher airspeed while avoiding prop rotor whirl instability. The switchable delta three combines the desirable features of two hub types into one hub to great advantage.

Referring to FIG. 1, an illustrative tiltrotor aircraft 10 is shown configured in the airplane mode. Tiltrotor aircraft 10 includes a fuselage 13 and a wing 15 extending from fuselage 13. Nacelles 19, 21 are rotatably mounted to opposite ends of wing 15. Nacelles 19, 21 can rotate between a helicopter mode in which the nacelles are oriented generally perpendicular to the ground and an airplane mode in which the nacelles are oriented generally parallel to the ground (e.g., as shown in FIG. 1). Each nacelle 19, 21 houses an engine for rotating an attached rotor assembly 23, 25. Each rotor assembly 23, 25 has a plurality of rotor blades 27. The illustrative embodiment shown in FIG. 1 is a four-blade design with four rotor blades 27 per each rotor assembly 23, 25. Each rotor assembly 23, 25 includes a spinning cover 29 that covers components of rotor assemblies 23, 25 and is included for aerodynamic purposes. Each rotor assembly 23, 25 includes a gimbaled rotor hub configuration that allows a yoke of the rotor assembly, and the rotor blades 27 secured thereto, to gimbal or pivot about a mast. Allowing the yoke to gimbal about the mast is particularly useful on tiltrotor aircraft as the gimbaling allows for greater maneuvering control of tiltrotor aircraft 10 when in helicopter mode.

Tiltrotor aircraft 10 also includes various computer systems and sensors that aid the pilot in flying tiltrotor aircraft 10. For example, tiltrotor aircraft 10 includes a flight control computer 30 that communicates with one or more sensors 32, 34. Sensors 32 can be positioned proximate to wing 15 and are used to provide data to flight control computer 30 about vibrations or bending in wing 15. For example, sensors 32 may be accelerometers or the like. Information about vibrations and bending in wing 15 can be used by flight control computer 30 to detect transients that could lead to catastrophic failure if proper precautions are not taken. One or more sensors 34 can be positioned proximate to nacelles 19, 21 to similarly monitor for vibrations in and around rotor assemblies 23, 25. In some aspects, sensors 34 can include sensors that monitor various parameters such as rotor speed, nacelle angle, engine speed, etc. For example, sensors 34 may include accelerometers, speed sensors, etc.

While gimbaling in helicopter mode is very beneficial, gimbaling in airplane mode presents several challenges and drawbacks. For example, there is an airspeed at which a conventional rotor assembly can become unstable. In some situations, the rotor assembly can become so unstable that the rotor assembly fails catastrophically. The airspeed at which this failure can occur is sometimes referred to as the stability speed. The failure is a result of complex rotor dynamics that stem from a transient being introduced to the rotor assembly that becomes amplified instead of dying out. In order to avoid these failures, tiltrotor aircraft operate below a stability margin, which is an airspeed less than the stability speed. For example, if the stability speed is 400 knots, the tiltrotor aircraft may operate at a maximum speed of 350 knots.

For gimbaling rotor assemblies having three blades, the stability speed is typically much higher than gimbaling rotor assemblies having more than three blades. The high stability speed of gimbaling three-blade rotor assemblies stems from the ability to design a gimbaling three-blade rotor assembly that has more desirable delta-3 values when operating in airplane mode. In contrast, a conventional gimbaling four blade rotor assembly has limitations regarding achievable delta-3 values. The limitation on delta-3 values for gimbaling four blade rotor assemblies is a spacing/packaging problem related to the geometry of the pitch horn and pitch-horn linkage. It has been determined that delta-3 values in the neighborhood of −10° to −15° are preferable for airplane mode. The packaging limitations of conventional four-blade designs can result in delta-3 values of around −40° to −45°.

Generally speaking, rotor assemblies having four or more blades would be preferable for tiltrotor aircraft. However, the delta-3 limitations of four-blade rotor assemblies significantly lower the stability speed of a tiltrotor aircraft compared to three blade rotor assemblies. In the past, three blade rotor assemblies have been favored because of their higher stability speed. Moving to a rotor assembly that has four or more blades is desirable because, compared to three-blade designs, designs including more than three blades reduce the load per blade, reduce noise, increase thrust, and allow for shorter blades to be used.

The instant invention overcomes the problems typically associated with conventional rotor assemblies having four or more blades by increasing the stiffness of the rotor assembly during airplane mode. In some aspects, the stiffness of the rotor assembly is increased by locking out the gimbaling ability of the rotor assembly. By changing the stiffness of the rotor assembly, the delta-3 of the rotor assembly in airplane mode can be reduced from, for example, around −45° to around −10°. This substantial change in delta-3 significantly increases the stability speed of a four rotor assembly, which makes using a rotor assembly having four or more blades attractive for tiltrotor aircraft.

Figure 2:
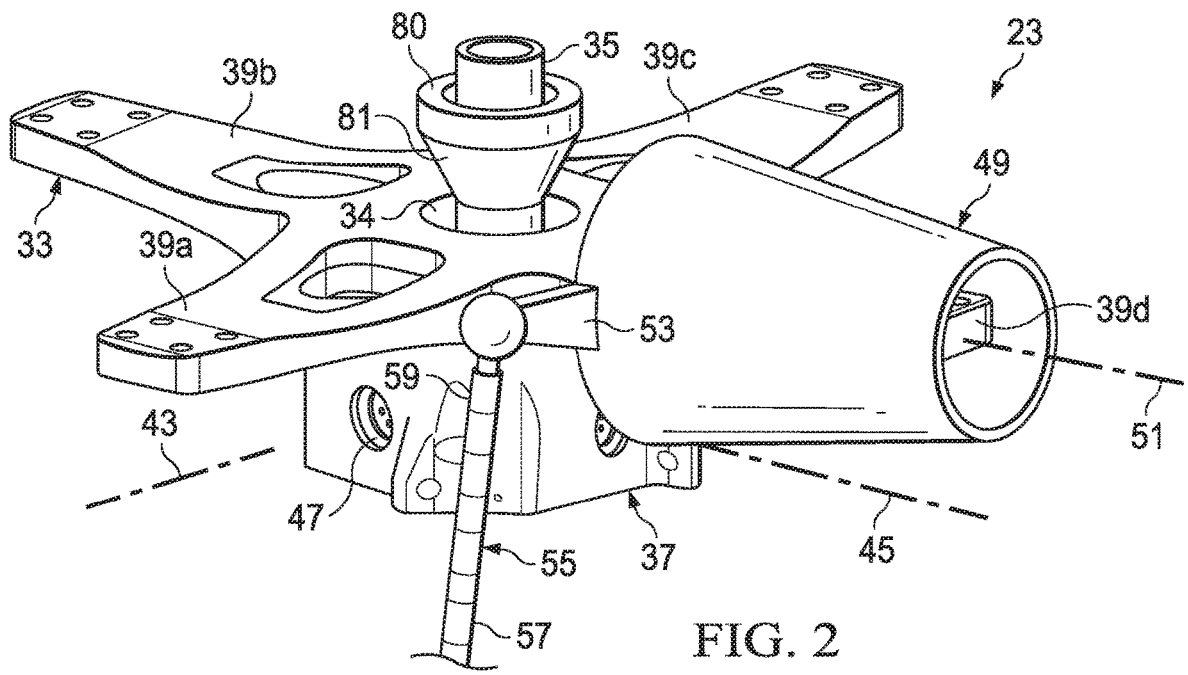
FIGS. 2 and 3 are views of a rotor assembly in unlocked and locked configurations, respectively, according to aspects of the disclosure.

FIG. 2 is an illustrative embodiment of rotor assembly 23. Rotor assembly 25 is very similar to rotor assembly 23. For simplicity, rotor assembly 23 will be discussed with the understanding that the discussion thereof applies to rotor assembly 25 as well. Rotor assembly 23 includes a yoke 33 that is connected to a mast 35 by a constant-velocity torque coupling 37 for rotation with mast 35. Yoke 33 includes four blade attachment arms 39a-39d and is rigidly connected to constant-velocity torque coupling 37. Constant-velocity torque coupling 37 has a portion that is pivotable relative to mast 35 through rotation about perpendicular axes 43, 45 on bearings 47. This configuration allows yoke 33 and rotor blades 27 attached to arms 39a-39d to gimbal relative to mast 35.

As an illustrative example, a blade grip 49 is shown attached to arm 39d. Blade grip 49 can pivot on arm 39d about an axis 51 for adjusting a pitch angle of an attached blade (e.g., a rotor blade 27). Blade grip 49 has a pitch horn 53 located on an inboard end of grip 49 and extending radially from grip 49. Movement of pitch horn 53 about axis 51 causes a corresponding change in blade pitch angle. Rotor assembly 23 is shown with only one blade grip 49 on yoke 33, though a blade grip 49 and rotor blade 27 would be attached to each of arms 39a-39d in the complete assembly.

Linkage 55 is provided for connecting each pitch horn 53 to a flight control system (not shown), such as, for example, a swashplate, for controlling the pitch angle of rotor blades 27 in response to input from the flight control system. A lower end 57 of linkage 55 connects to the flight control system and an upper end 59 connects to pitch horn 53. The flight control system may be in a fixed position relative to mast 35 or may move relative to mast 35 during operation, but the flight control system does not gimbal with yoke 33 and the attached rotor blades 27 relative to mast 35.

The ability of rotor assemblies 23, 25 to gimbal about mast 35 is useful for helicopter mode as it allows much greater control to maneuver tiltrotor aircraft 10. During airplane mode, the ability of rotor assemblies 23, 25 to gimbal is not needed and is actually undesirable as gimbaling of the rotor during airplane mode can create instabilities and loading issues. Conventional tiltrotors have dealt with gimbaling related problems in airplane mode by limiting the airspeed of the tiltrotor and/or using a rotor assembly having three rotor blades. As noted above, conventional gimbaling rotor assemblies having three rotor blades can be made more stable for airplane mode than conventional gimbaling rotor assemblies having four or more blades.

Figure 3:
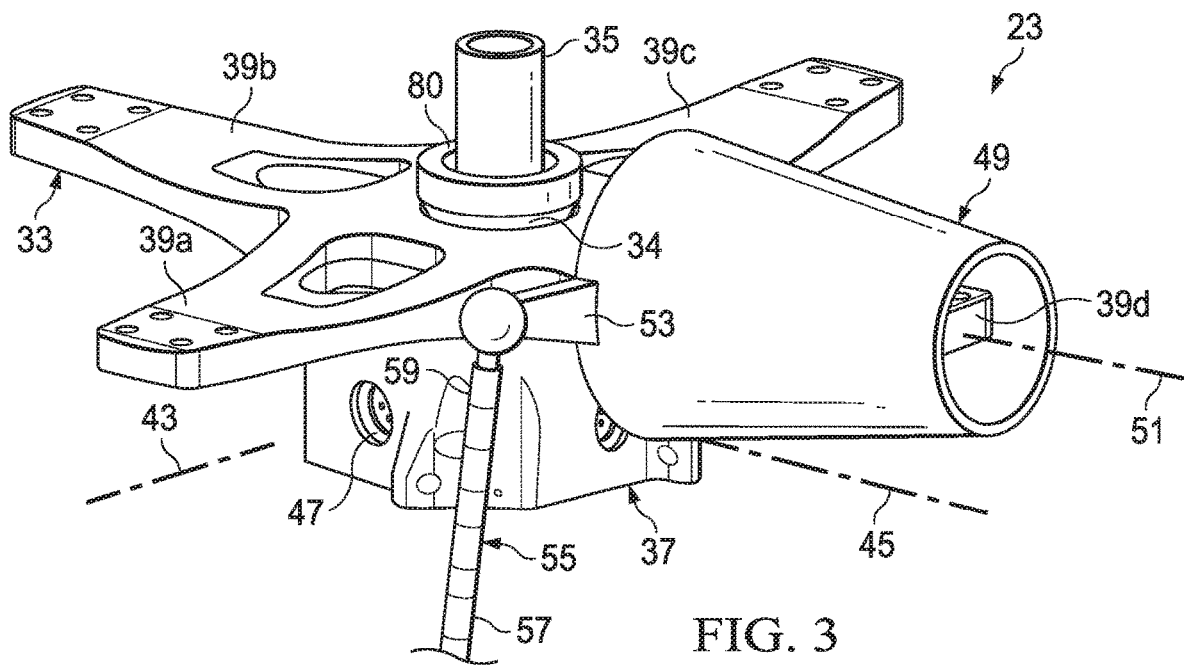

In order to overcome the problems associated with gimbaling rotor assemblies including more than three rotors, it has been discovered that stiffening the rotor assembly during airplane mode can change the delta-3 from around −45° to around −10°. Stiffening of the rotor assembly can be achieved in variety of ways. For example, rotor assembly 23 includes a gimbal lock 80 that is positioned around mast 35. Gimbal lock 80 rotates with mast 35 and is configured to slide along mast 35 between an unlocked position (e.g., see FIG. 2) and a locked position (e.g., see FIG. 3). Gimbal lock 80 can be moved along mast 35 in a variety of ways. For example, an actuator 82 and can be used to translate gimbal lock 80 up and down mast 35. In some aspects, actuator 82 is coupled to gimbal lock 80 via one or more linkages 83. Actuator 82 can be an electric actuator or a hydraulic actuator.

In the unlocked position, gimbal lock 80 does not prevent yoke 33 from gimbaling about mast 35 (e.g., see FIG. 2, helicopter mode). In the locked position, gimbal lock 80 slides down mast 35 so that a sloped surface 81 of gimbal lock 80 contacts a lip of an opening 34 of yoke 33. In this position, yoke 33 becomes locked and can no longer gimbal relative to mast 35 (e.g., see FIG. 3, airplane mode). When yoke 33 can no longer gimbal, rotor assembly 23 has effectively become much stiffer than in the unlocked configuration. In some aspects, the stiffness of rotor assembly 23 in the locked configuration is an order of magnitude or more higher than the stiffness in the unlocked configuration. The increased stiffness results in a change of the delta-3 of rotor assembly 23 from around −45° to around −10°.

Gimbal lock 80 is provided as an example of how the stiffness of rotor assembly 23 can be increased. Other methods of locking out the gimbaling ability of rotor assembly 23 could be used to achieve the similar results.

Referring now to FIGS. 4 and 5, simplified schematic illustrations of rotor assembly 23 in an unlocked and locked configuration, respectively, are shown. Rotor assembly 25 is very similar to rotor assembly 23. For simplicity, rotor assembly 23 will be discussed with the understanding that the discussion thereof applies to rotor assembly 25 as well. FIG. 4 illustrates rotor assembly 23 in an unlocked configuration. In the unlocked configuration, gimbal lock 80 is withdrawn from opening 34 of yoke 33 and positioned so that yoke 33 can gimbal about mast 35. In the unlocked configuration of FIG. 4, the flap center of rotor assembly 23 is located generally in the middle of yoke 33 at A and yoke 33 and rotor blades 27 are free to pivot about A. An exemplary range of movement of yoke 33 and rotor blades 27 is illustrated with dashed outlines.

FIG. 5 illustrates rotor assembly 23 in a locked configuration. In the locked configuration, gimbal lock 80 has moved down mast 35 so that sloped surface 81 of gimbal lock 80 contacts the lip of opening 34 to prevent yoke 33 from gimbaling relative to mast 35. In the locked configuration, the flap center of rotor assembly 23 has changed compared to the unlocked configuration. Compared to the locked configuration where the flap center for each rotor blade 27 converged to the middle of yoke 33 at A, the locked configuration features flap centers that have moved outward radially to B. Although FIG. 5 only illustrates two rotor blades 27, it will be appreciated that the other two rotor blades 27 in a four blade design have flap centers that have been similarly moved from the center of yoke 33 to a position radially outward therefrom. The location of B in FIG. 5 is shown for illustrative purposes and does not necessarily indicate the exact location of the flap center. Various factors such as material choices and dimensions of the yoke, blade, flexures, etc. can alter the exact location of B. What is certain is that the location of the flap centers for each rotor blade 27 in the locked configuration of FIG. 5 are moved radially outward relative to the flap centers in the unlocked configuration of FIG. 4. The relocation of the flap centers of each rotor blade 27 is the result of stiffening rotor assembly 23. Furthermore, the relocation of the flap center of each rotor blade 27 results in the change in the delta-3 value from around −45° to around −10°. This change in delta-3 value enables tiltrotor aircraft 10 to use a four-blade rotor design that is capable of a higher stability speed compared to four-blade designs that do not increase the stiffness of the rotor assembly during airplane mode.

An illustrative method of transitioning a gimbaling rotor assembly between an unlocked configuration and a locked configuration will now be discussed relative to FIGS. 1-5. As noted above, allowing rotor assemblies 23, 25 to gimbal while tiltrotor aircraft 10 is in helicopter mode increases the maneuverability of tiltrotor aircraft 10 in helicopter mode. Tiltrotor aircraft 10 takes off in helicopter mode and gains altitude. In some aspects, the engines of tiltrotor aircraft 10 are operating at 100% during helicopter mode. Once tiltrotor aircraft 10 has gained sufficient altitude, tiltrotor aircraft 10 begins gaining forward velocity (e.g., pilot pushes forward on the cyclic). Gaining forward velocity causes air to flow over wing 15. Flowing air over wing 15 begins to generate lift. After gaining forward velocity, nacelles 19, 21 can begin pivoting forward for airplane mode. In some aspects, tiltrotor aircraft 10 gains at least 80 knots of forward velocity before nacelles 19, 21 begin transitioning to airplane mode. As nacelles 19, 21 pivot, rotor assemblies 23, 25 being to generate more forward thrust and tiltrotor aircraft 10 continues to gain additional airspeed. As more airspeed is gained, wing 15 begins to generate more lift. Eventually, tiltrotor aircraft 10 gains enough forward velocity that wing 15 generates enough lift to sustain forward flight.

Once nacelles 19, 21 have pivoted all the way down into airplane mode, rotor assemblies 23, 25 can be stiffened. In some aspects, rotor assemblies 23, 25 are stiffened by engaging gimbal locks 80 with their respective yokes 33. In some aspects, flight control computer 30 engages gimbal locks 80 with their respective yokes 33 by activating actuator 82 to move gimbal locks 80 in the locked position. In some embodiments, flight control computer 30 monitors data from one or more of sensors 32, 34 to monitor for any transients that may exist in rotor assemblies 23, 25 as a result of the process of transitioning nacelles 19, 21 to airplane mode. For example, transients such as flapping or whirl (i.e., wobbling of the rotor disc) can be induced by the process of transitioning from helicopter mode to airplane mode. Transients result in vibrations and/or bending of nacelles 19, 21 and/or wing 15 that can be detected by sensors 32, 34. In some aspects, once flight control computer 30 has determined that any transients caused by pivoting nacelles 19, 21 have died out, flight control computer 30 determines that conditions are stable and automatically (i.e., without input from the pilot) engages both gimbal locks 80 with their respective yokes 33. In other aspects, a pilot may instruct flight control computer 30 to engage both gimbal locks 80.

After rotor assemblies 23, 25 have transitioned into the locked configuration, rpm of the engines can be reduced from 100% down to 80-85%. The amount of rpm reduction varies depending on the particular tiltrotor aircraft being used. Engine rpm is usually reduced in airplane mode to gain efficiency and to reduce a speed of rotor blades 27 so that tips of rotor blades 27 do not exceed the speed of sound. Once in airplane mode, the pilot can control an amount of thrust generated by rotor assemblies 23, 25 via the collective control, which controls the pitch of rotor blades 27.

In some aspects, engine rpm can be reduced from 100% to 80-85% before rotor assemblies 23, 25 are stiffened. Once rpm has been reduced and any transients resulting therefrom have died out, rotor assemblies 23, 25 can be stiffened by, for example, engaging gimbal locks 80 with their respective yokes 33.

A method to transition rotor assemblies 23, 25 from the locked configuration to the unlocked configuration is similar to the method discussed above with the steps reversed. For example, tiltrotor aircraft 10 slows its airspeed to a speed just above stalling. Prior to transitioning to helicopter mode, the stiffening of rotor assemblies 23, 25 must be undone to allow the proper control of tiltrotor aircraft 10 needed for helicopter mode. In aspects in which gimbal locks 80 are used to stiffen rotor assemblies 23, 25, gimbal locks 80 are disengaged from their respective yokes 33. In some aspects, flight control computer 30 activates actuator 82 to disengage gimbal locks 80 from their respective yokes 33. Once gimbal locks 80 are disengaged from yokes 33, the rpm of the engines may be increased to 100%. The airspeed of tiltrotor aircraft 10 is slowly decreased to an airspeed approaching stall and nacelles 19, 21 are pivoted back into the vertical orientation for helicopter mode. As nacelles 19, 21 are pivoted into the vertical orientation, rotor assemblies 23, 25 transition from providing forward thrust for airplane mode to providing vertical thrust for helicopter mode.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," "around," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of increasing a stability speed of a tiltrotor aircraft, the method comprising:
   pivoting a rotor assembly of the tiltrotor aircraft from a first position for operating the tiltrotor aircraft in a helicopter mode to a second position for operating the tiltrotor aircraft in an airplane mode; and
   increasing a stiffness of the rotor assembly when the rotor assembly is in the second position, wherein the rotor assembly comprises at least four rotor blades, wherein the increasing the stiffness of the rotor assembly decreases a delta-3 angle of the rotor assembly.

2. The method of claim 1, wherein the increasing the stiffness of the rotor assembly comprises locking a yoke of the rotor assembly so that the yoke cannot gimbal about a mast of the rotor assembly.

3. The method of claim 2, wherein the locking the yoke comprises moving a gimbal lock into contact with the yoke.

4. The method of claim 3, wherein the gimbal lock comprises a sloped surface configured to mate with a lip of an opening in the yoke.

5. The method of claim 3, wherein the moving is performed by an actuator that is coupled to the gimbal lock.

6. The method of claim 5, wherein the actuator is controlled by a flight control computer.

7. The method of claim 6, wherein the flight control computer activates the actuator when the rotor assembly is in the second position.

8. The method of claim 6, wherein the flight control computer monitors one or more sensors and activates the actuator responsive to determination that the rotor assembly is stable.

9. The method of claim 8, wherein the one or more sensors comprise a first sensor located proximate to a wing of the tiltrotor aircraft and a second sensor located proximate the rotor assembly, the first sensor configured to monitor bending within the wing and the second sensor configured to monitor vibrations in the rotor assembly.

10. The method of claim 1, wherein prior to the increasing the stiffness of the rotor assembly, a speed of an engine coupled to the rotor assembly is decreased.

11. The method of claim 1, wherein the stiffness of the rotor assembly in the second position is at least an order of magnitude greater than the stiffness of the rotor assembly in the first position.

12. The method of claim 1, wherein, when the rotor assembly is in the second position, a flap center of each rotor blade of the at least four rotor blades is located at a distance radially outward from the flap center of each rotor blade of the at least four rotor blades when the rotor assembly is in the first position.

13. A method of increasing a stability speed of a tiltrotor aircraft, the method comprising:
   pivoting a rotor assembly of the tiltrotor aircraft from a first position for operating the tiltrotor aircraft in a helicopter mode to a second position for operating the tiltrotor aircraft in an airplane mode, the rotor assembly comprising at least four rotor blades; and
   moving, during flight, flap centers of each of the at least four rotor blades radially outward from a mast of the rotor assembly to lower a delta-3 angle of the rotor assembly when the rotor assembly is in the second position.

14. The method of claim 13, wherein the moving the flap centers of each of the at least four rotor blades comprises locking a yoke of the rotor assembly so that the yoke cannot gimbal about a mast of the rotor assembly.

15. The method of claim 14, wherein the locking the yoke comprises moving a gimbal lock into contact with the yoke.

16. The method of claim 15, wherein the moving is performed by an actuator that is coupled to the gimbal lock.

17. The method of claim 16, wherein:
   the actuator is controlled by a flight control computer; and
   the flight control computer activates the actuator when the rotor assembly is in the second position.

18. The method of claim 17, wherein:
   the flight control computer monitors one or more sensors; and
   the one or more sensors comprise a first sensor located proximate to a wing of the tiltrotor aircraft and a second sensor located proximate the rotor assembly, the first sensor configured to monitor bending within the wing and the second sensor configured to monitor vibrations in the rotor assembly.

19. The method of claim 13, wherein a stiffness of the rotor assembly in the second position is at least an order of magnitude greater than the stiffness of the rotor assembly in the first position.

* * * * *